Patented July 4, 1939

2,164,810

UNITED STATES PATENT OFFICE 2,164,810

METAL POLISH

Marcellus T. Flaxman, Wilmington, Calif., assignor to Union Oil Company of California, Los Angeles, Calif., a corporation of California No Drawing. Application December 5, 1933, Serial No. 701,057

4 Claims. (Cl. 87—5)

This invention relates to metal polishes and the object is to produce such a polish which will have a satisfactorily fine abrasive action and a suitable detergent characteristic, which will not curd, which will apply readily, will dry freely, and may be readily wiped off and polished. An important object is to avoid in a polish of this character the use of a solvent such as alcohol and the like which has ordinarily been required heretofore to overcome curding of the soap used and has at the same time been inflammable. It is therefore a further object to produce a polish having these characteristics which will not require inflammable solvents and will meet all fire restrictions and the like.

Primarily the invention resides in a polish of the character stated containing an appropriate quantity of fine silica and a suitable quantity of water, in which ammonium soaps of coconut fatty acids have been formed both for the purpose of producing a polish of suitable viscosity and proper body and for affording good detergent properties. The invention also includes the use in such a polish of ammonium carbonate which further aids in producing desired viscosity, body and detergent action, in conjunction with the fine silica employed. It has been found that the coconut fatty acid soaps curd very slightly if at all and therefore avoid entirely the necessity for employing a soap solvent such as alcohol, as in previous polishes of this type.

I have found that a very desirable composition results from the use of fine silica (99% of minus 325 mesh) equal to about fifteen (15) parts, ammonium carbonate about one (1) part, coconut fatty acids about three (3) parts, ammonia about one (1) part to combine with the coconut fatty acids to produce ammonia soaps together with a small excess of about one-third or one-fourth part ammonia, and about twenty (20) to twenty-five (25) parts of water. The ammonia is employed in the form of aqua ammonia or ammonium hydroxide.

This general proportion has been developed in a particular instance as in the following table, although these specific proportions are variable as generally indicated above:

| | Percent by weight | Parts |
|---|---|---|
| Fine silica (99% to pass 325 mesh) | 35.00 | 15 |
| Ammonium hydroxide (0.9 sp. gr.) | 2.88 | 1¼ |
| Coconut fatty acid | 6.60 | 3 |
| Ammonium carbonate | 2.30 | 1 |
| Water | 53.22 | 23 |
| | 100.00 | |

Pigment and perfume are optional. Obviously the water may vary within considerable limits, and the percentage of the silica may also vary within considerable limits. However the proportions of the soap-forming materials with respect to the ammonium carbonate is not widely variable, the proportion closely approximating one (1) part of ammonium carbonate to four (4) parts of the ammonium soap resulting from the reaction between the coconut fatty acids and ammonium hydroxide. The amount of coconut fatty acids, and consequently the amount of resultant soap, is of course variable slightly with respect to the ammonium carbonate, depending upon the viscosity required in the liquid polish. And of course these two are widely variable with respect to the silica and the water according to the viscosity required and the spreading properties desired in the products. In connection with the above specific example with the particular fatty acids used it was found that for a high grade polish the ammonium carbonate should be confined within about 2.1% to 2.4% or at least between 2% to 2.5%, although limits of 1.5% to 3.0% produce a satisfactory polish for some uses.

In general, however, it has been found desirable to follow fairly closely the proportion of carbonate to soap material in order to obtain a proper stability of the polish, and it has also been found desirable to follow approximately the parts of silica and water given in producing a satisfactory commercial polish for the general market. Apparently most of the desirable characteristics are afforded by reason of the presence of the soap and ammonium carbonate, the soap apparently being particularly valuable for the reason that it affords the necessary body and detergent properties and does not curd in the solution used. Thus not only does the soap serve to cut and remove grease but it also largely contributes to the body necessary for holding the abrasive in proper suspension. Since ordinarily oleic acid soaps and sodium soaps curd readily in alkaline solution unless alcohol or other suitable solvent is used, it is necessary to use some other soap which shall be readily soluble in the alkaline aqueous solution. The mentioned ammonium soaps of the coconut fatty acids are an outstanding example. Since these acids include principally lauric acid and myristic acid as well as substantial quantities of caprylic and capric acids, such acids from other sources would be equally satisfactory.

The silica employed is always to be fine enough to avoid scratching; otherwise there are no particular restrictions upon this ingredient. As to the ammonium carbonate, any equivalent must be a salt formed from a weak acid and a weak base and adapted to have the same action in building up body in the polish as does the ammonium carbonate. This action apparently is to keep the soap salted out more or less. A suitable example of such an equivalent is ammonium citrate, although it does not always produce so smooth a product.

In order to obtain a polish composition of the desired physical characteristics it is important to follow a fairly well defined procedure. Such a procedure is as follows: The ammonium carbonate and ammonia are dissolved in about 75% of the water to be used. The silica is added to the solution with gentle agitation, and this agitation is continued until the batch is uniform. The coconut fatty acids are then added slowly and agitation again continued until the batch is uniform. A temperature range around room temperature, e. g., about 70° F. or up to 80 to 90° F. is ordinarily taken as the operating temperature. After uniformity has been reached the batch is vigorously agitated for 5 to 10 minutes and then the remainder of the water is added and again brought up to uniformity with gentle agitation. Excess agitation must be avoided, inasmuch as it tends to break down the soap body. The agitation should be carried on only to an extent necessary to obtain the proper smoothness in the composition. This element of smoothness in the polish is of considerable value from the standpoint of application, and has been best attained by following the procedure just outlined. It has been found that in every mixture a point is reached in the viscosity curve, as influenced by the ammonium carbonate, which is critical, and that as the percentage of ammonium carbonate in the given mixture is increased from that point the viscosity drop is sharp. Likewise in each mixture the rise in the curve as said point is approached is rather sharp. For these reasons an attempt is made to use that amount of ammonium carbonate which represents the highest point of the viscosity curve. While this effect may be due to the salting out influences of the ammonium carbonate, it is to be understood that applicant does not bind himself to this theory nor to any other phases of theory herein suggested. When the functions of the ammonium carbonate are not important the quantity of this agent may be reduced or it may be entirely omitted according to requirements.

Similarly the function of the ammonium carbonate may be employed in somewhat different compositions. Thus, where curding is not objectionable, or is to be controlled with alcohol or similar solvent, some other soap may be used such as an oleate, and this soap instead of being an ammonium soap could be a sodium or potassium soap. And other ingredients could be added thereto. Thus the following has been used:

| | Parts |
|---|---|
| Fine silica | 50 |
| Water | 60 |
| Ammonia hydroxide (sp. gr. 0.9) | 4 |
| Ethanol (95%) | 8 |
| Methanol (95%) | 2 |
| Oleic acid | 5 |
| Ammonium carbonate | 2 |
| Pine oil | 1 |

The percentages here are also subject to variation in much the same degree as indicated for polishes previously described.

As to the amount of ammonia it is desirable that the excess be kept down to around 1% or less of the total composition in order that too strong an odor in the product may be avoided and also to avoid development of excess pressure in the packages in which the product is placed for distribution.

It is to be understood that the specific disclosures made herein are to be taken merely as illustrative of the generic invention and not as limiting.

I claim:

1. A metal polish free from alcohol comprising fine silica about fifteen parts, ammonium carbonate about one part, ammonium soaps of coconut fatty acids about four parts, water about twenty to twenty-five parts and less than one part of free ammonia, the proportions being by weight.

2. A metal polish comprising the reaction products of ammonium hydroxide with coconut fatty acids amounting to about one-tenth of the composition, ammonium carbonate equal to about two to two and one-half percent. of the composition, fine silica about 35%, and water, the polish being non-curding in the absence of alcohol, the proportions being by weight.

3. A method of producing a metal polish comprising dissolving about two to two and one-half percent. of ammonium carbonate in about three-fourths of the required total quantity of water, adding ammonium hydroxide thereto approximating about 3% of the resultant composition, then supplying fine silica with gentle agitation equal to about 35% of the composition, then adding coconut fatty acids approximating 7% of the composition, agitating the mass gently to uniformity and adding additional water with further gentle agitation to complete the mixture, the proportions being by weight.

4. A method according to claim 3 wherein the operations are carried on at around 70 to 90° F.

MARCELLUS T. FLAXMAN.